Dec. 3, 1929.  A. F. KLINZING  1,738,300
ANIMAL DRINKING FOUNTAIN
Filed Sept. 13, 1926
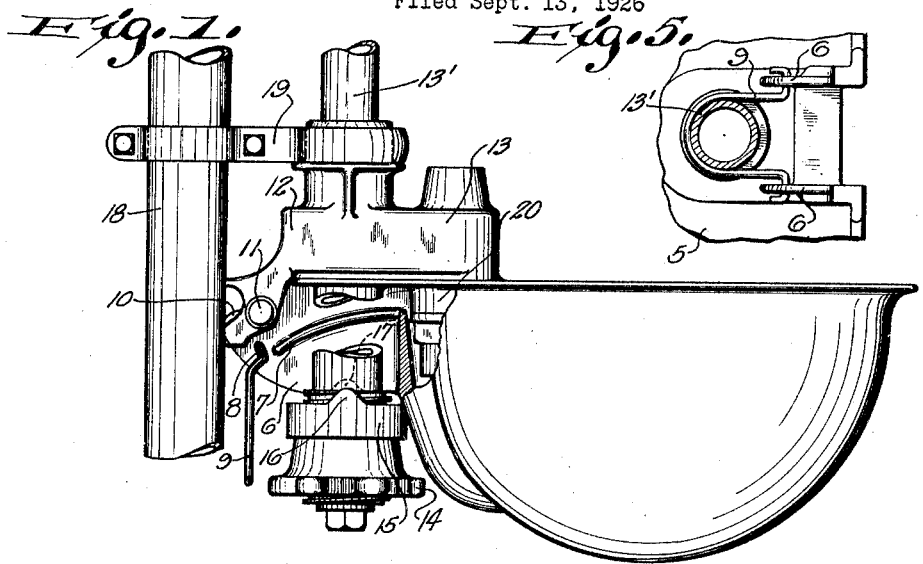
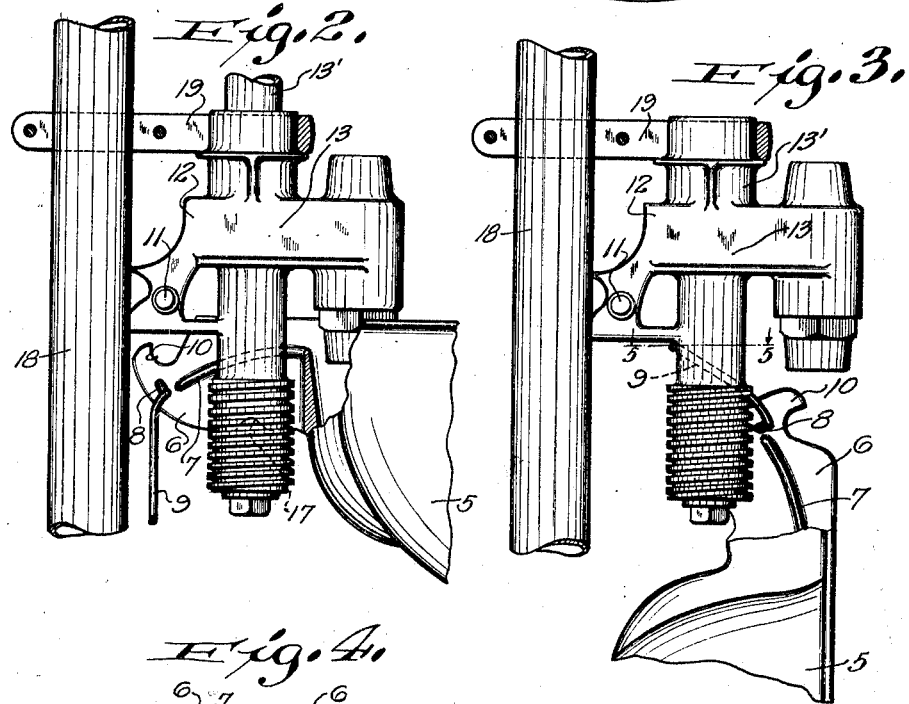
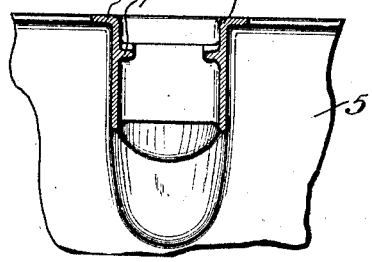
INVENTOR.
August F. Klinzing.
BY Morsell, Keeney & Morsell
ATTORNEYS Patented Dec. 3, 1929

1,738,300

UNITED STATES PATENT OFFICE

AUGUST F. KLINZING, OF MILWAUKEE, WISCONSIN

ANIMAL DRINKING FOUNTAIN

Application filed September 13, 1926. Serial No. 135,165.

This invention relates to improvements in animal drinking fountains.

It is one of the objects of the present invention to provide a drinking fountain for animals in which the bowl may be lowered to a tilted vertical position on the fountain to facilitate the process of cleaning.

A further object of this invention is to provide a means for lowering the bowl for cleaning, so that it may also be swung around to any position on the fountain in case a partition interferes with the cleaning.

A further object of the invention is to provide a means for retaining the bowl upon the support when it is in the cleaning position, so that it will not drop upon the floor and break.

A further object is to provide ribs on the inner faces of the flanges of the bowl member to serve as stop guides when the bowl is being lowered to the cleaning position.

With the above main and other incidental objects in view, which will appear as the description proceeds, my invention resides in the novel construction, combination and arrangement of parts as hereinafter described.

Referring to the accompanying drawing in which the same numerals designate the same parts in all of the views:

Fig. 1 is a side view of the improved fountain with a portion of the supply pipe and one of the bowl flanges broken away;

Fig. 2 is a fragmentary view of the bowl partially lowered, the entire supply pipe being shown and the relation of the bowl thereto in normal position;

Fig. 3 is a fragmentary view showing the bowl in its lowered position for cleaning, a portion of one of the bowl flanges being broken away;

Fig. 4 is an end view of the bowl detached from the fitting, portions of the bowl being broken away and portions being shown in section; and Fig. 5 is a section taken of line 5—5 of Fig. 3 with the bowl in a horizontal position.

Referring more particularly to the accompanying drawing, the numeral 5 designates the bowl which is provided with a pair of rearwardly extending flanges 6. Each of said flanges is provided on its inner face with a curved rib 7, and also with a slot 8 for receiving one end of a U-shaped retaining member 9. Each of said flanges is also formed with a hook-shaped hinge portion 10 which is adapted to engage one of a pair of trunnions 11 which extend oppositely from a projection 12, of the fitting 13. The fitting also comprises a supply pipe 13' and fountain mechanism 20. On the lower part of the supply pipe portion of the fitting is threaded a nut 14, which operates upon a locking ring 15. Said locking ring is formed with a pair of oppositely disposed lugs 16 which are adapted to engage recesses 17 in the flanges of the bowl when the hand nut is tightened.

The entire bowl and fitting is secured to a vertical stall member 18 by means of a clamping member 19 which engages the stall member 18 and the fitting 13.

Fountain mechanism 20, connected with the supply pipe, extends within the bowl, and has the usual valve pressure plate which is arranged to be operated by an animal.

When it is desired to lower the bowl for cleaning, the hand nut is loosened and the locking ring drops down with the nut. This causes the hook-shaped hinges 10 to disengage the trunnions 11 and allows the bowl to drop down until the ribs 7 rest upon the top of the threaded portion of the supply pipe as shown in Fig. 2. By pulling the bowl outwardly with the ribs 7 riding on the top threads, the U-shaped retaining member 9 is brought into engagement with the supply pipe and rests upon the top of the threaded portion holding the bowl in the loose position shown in Fig. 3. When in this position, the bowl may be moved up or down or pivoted on the pipe in whichever position is most suitable for cleaning. The ribs and the U-shaped member prevent the bowl from dropping to the floor and breaking, but permits the aforementioned free movement of the bowl in any direction. This feature of my invention is believed to be entirely novel, and it greatly facilitates the process of cleaning the bowl. It will thus be seen that it is a great aid in keeping barns sanitary. It obviates the necessity of entirely removing the bowl, which is very difficult with the ordinary device, and it also does away with the danger of dropping it which is attendant upon a complete removal. As the modern barn usually has a concrete floor, dropping the bowl frequently results in its destruction and this necessitates replacement.

From the foregoing description it may be seen that the improved animal drinking fountain is simple and novel in construction, is strong and durable, and is well adapted for the purpose described.

What I claim as my invention is:

1. An animal drinking fountain, comprising a fitting, a bowl non-removably associated therewith, and pivotal means permitting lowering the bowl and retaining it in a tilted position for cleaning, and also permitting circumferential movement of the bowl in a horizontal plane.

2. An animal drinking fountain, comprising a fitting, a bowl associated therewith, and means permitting lowering and retaining the bowl in a vertical position for cleaning and also permitting circumferential movement of the bowl in a horizontal plane.

3. An animal drinking fountain, comprising a fitting having fountain mechanism and also having a threaded lower end portion, a bowl associated with said fitting, a retaining member attached to the rear part of said bowl and normally hanging freely therefrom, and a nut threaded on the fitting normally holding the bowl in its operative position, the retaining member slidably embracing the fitting after the nut has been loosened for lowering the bowl to its inoperative or cleaning position.

4. An animal drinking fountain, comprising a fitting having a fountain mechanism, a bowl associated with said fitting, a retaining member attached to the rear part of said bowl and normally hanging freely therefrom, and means for holding the bowl in its operative position, the retaining member slidably engaging the fitting when the bowl is being lowered to the inoperative or cleaning position.

5. An animal drinking fountain comprising a fitting having fountain mechanism, a bowl having a pair of spaced rearwardly projecting flanges normally embracing said fitting, a retaining member normally hanging freely from said flanges, and means for holding the bowl in its operative position, the retaining member slidably engaging the fitting when the bowl is lowered to its inoperative or cleaning position.

6. An animal drinking fountain comprising a fitting having fountain mechanism, a bowl having a pair of spaced rearwardly projecting flanges normally embracing said fitting, a U-shaped retaining member having its ends attached to said flanges and means for holding the bowl in operative position, the retaining member slidably engaging the fitting when the bowl is being lowered to its inoperative or cleaning position.

7. An animal drinking fountain comprising a fitting having fountain mechanism, a bowl having a pair of spaced rearwardly projecting flanges formed with ribs on their inner faces which normally embrace said fitting, a retaining member attached to said flanges and means for holding the bowl in its operative position, the ribs on the flanges serving as stop guides to prevent the removal of the bowl while moving it from its operative to its inoperative or cleaning position.

8. An animal drinking fountain comprising a fitting having fountain mechanism and having a threaded lower end portion, a bowl having a pair of spaced rearwardly projecting flanges, said flanges having ribs on their inner faces and normally embracing said fitting, a retaining member attached to said flanges and a nut threaded on the fitting and holding the bowl in its operative position, the ribs on the flanges serving as stop guides to prevent removal of the bowl while moving it from its operative to its inoperative position.

9. An animal drinking fountain comprising a fitting having fountain mechanism, said fitting having a pair of oppositely extending trunnions, and a threaded lower end portion, a bowl having a pair of spaced rearwardly projecting flanges, said flanges having ribs on their inner faces and having hinge portions for engaging said trunnions when the bowl is in the operative position, a U-shaped retaining member pivotally attached to said flanges, and a nut threaded on the fitting to hold the bowl in its operative position, the ribs on said flanges resting on the threaded portion of the fitting and serving as stop guides to prevent removal of the bowl after the nut has been loosened while moving from its operative to its inoperative or cleaning position.

10. An animal drinking fountain comprising a fitting having fountain mechanism, said fitting having a pair of oppositely extending trunnions and a threaded lower end portion, a bowl having a pair of spaced rearwardly projecting flanges, said flanges having ribs on their inner faces and having hinge portions for engaging said trunnions when the bowl is in its operative position and a nut threaded on the fitting to hold the bowl in its operative position, the ribs on said flanges resting on the threaded portion of the fitting and serving a stops to prevent removal of the bowl after the nut has been loosened, while moving the bowl from its operative to its inoperative or cleaning position.

11. An animal drinking fountain, comprising a fitting, a bowl associated therewith, and pivotal means permitting lowering the bowl and retaining it in a tilted position for cleaning, and also permitting circumferential movement of the bowl in a horizontal plane.

In testimony whereof, I affix my signature.

AUGUST F. KLINZING.